US009467521B2

(12) United States Patent
Owens (10) Patent No.: US 9,467,521 B2
(45) Date of Patent: Oct. 11, 2016

(54) SYSTEM AND COMPUTER IMPLEMENTED METHOD OF PERSONAL MONITORING

(71) Applicant: David S. Owens, Enon, OH (US)

(72) Inventor: David S. Owens, Enon, OH (US)

( * ) Notice: Subject to any disclaimer, the term of this patent is extended or adjusted under 35 U.S.C. 154(b) by 171 days.

(21) Appl. No.: 14/242,902

(22) Filed: Apr. 2, 2014

(65) Prior Publication Data

US 2015/0288770 A1 Oct. 8, 2015

(51) Int. Cl.
*G06Q 50/18* (2012.01)
*H04L 29/08* (2006.01)

(52) U.S. Cl.
CPC ............ *H04L 67/22* (2013.01); *G06Q 50/186* (2013.01); *H04L 67/28* (2013.01)

(58) Field of Classification Search
None
See application file for complete search history.

(56) References Cited

U.S. PATENT DOCUMENTS

| | | | |
|---|---|---|---|
| 6,324,650 | B1 | 11/2001 | Ogilvie |
| 7,911,334 | B2 | 3/2011 | Busey |
| 8,156,121 | B2 | 4/2012 | Reese et al. |
| 8,285,845 | B2 | 10/2012 | Urbanek et al. |
| 8,334,763 | B2 | 12/2012 | Jackson |
| 8,375,092 | B2 | 2/2013 | Digate et al. |
| 2002/0042846 | A1 | 4/2002 | Bottan et al. |
| 2006/0168065 | A1* | 7/2006 | Martin ............... G06Q 10/107 709/206 |
| 2007/0271345 | A1 | 11/2007 | Callanan et al. |
| 2008/0311880 | A1 | 12/2008 | Copley, III |
| 2009/0281861 | A1 | 11/2009 | Miller et al. |
| 2011/0314104 | A1* | 12/2011 | Gray .................. G06Q 10/10 709/205 |
| 2012/0016803 | A1* | 1/2012 | Tharp ................. G06Q 10/10 705/319 |
| 2012/0047055 | A1* | 2/2012 | Aiello ................. G06Q 40/00 705/35 |
| 2012/0220265 | A1 | 8/2012 | Liu |
| 2012/0232868 | A1 | 9/2012 | Ricketts |
| 2012/0238251 | A1 | 9/2012 | Lee et al. |
| 2012/0260351 | A1 | 10/2012 | Majeti et al. |
| 2012/0295645 | A1 | 11/2012 | Yariv et al. |
| 2012/0309363 | A1 | 12/2012 | Gruber et al. |
| 2012/0315880 | A1 | 12/2012 | Peitrow et al. |
| 2013/0012175 | A1 | 1/2013 | Butterfield et al. |

(Continued)

FOREIGN PATENT DOCUMENTS

| | | |
|---|---|---|
| EP | 0986020 B1 | 10/2011 |
| WO | WO2007022296 A2 | 2/2007 |

(Continued)

OTHER PUBLICATIONS

Duncan Geere, "Google releases data-after-death tool," Apr. 13, 2013, 2 pgs.
Savior System, myLegacy.org, About MyLegacy.org, http://mylegacy.org/about.htm, Apr. 17, 2013, 1 page.

(Continued)

*Primary Examiner* — Jennifer To
*Assistant Examiner* — Beau Spratt
(74) *Attorney, Agent, or Firm* — Eckert Seamans Cherin & Mellott, LLC; David C. Jenkins (57) ABSTRACT

A system and computer implemented method of personal monitoring is provided. The method includes allowing a user to engage in a number of on-line activities, determining, on a computer, if the user engaged in on-line activities, and if the determination is negative, then performing, on a computer, a number of responsive actions. The system and method further provide for an investigation of external modules; that is, the system and method investigate external sites such as, but not limited to, social networks, forums, weblogs (blogs), that are not associated with the personal monitoring module. The system and method further allow a proxy to respond for the user.

1 Claim, 4 Drawing Sheets

(56) References Cited

U.S. PATENT DOCUMENTS

| | | | | |
|---|---|---|---|---|
| 2013/0144960 A1* | 6/2013 | Salamat | ............... | H04L 51/32 709/206 |
| 2013/0262514 A1* | 10/2013 | Everett | ............... | G06F 21/6227 707/781 |
| 2014/0122627 A1* | 5/2014 | Arnold | ............... | H04L 51/14 709/206 |

FOREIGN PATENT DOCUMENTS

| | | |
|---|---|---|
| WO | WO2007107631 A1 | 9/2007 |
| WO | WO2011026096 A2 | 3/2011 |

OTHER PUBLICATIONS

The digital beyond, http://www.thedigitalbeyond.com/onlline-services-list, Apr. 17, 2013, pp. 1-13.

[INFO] rTriggers v2.4—Messages/commands on login, death, commands and timers [1240], http://forums.bukkit.org/threads/info-rtriggers-v2-4-messages-commands-on-login-death-c . . . , Apr. 17, 2013, pp. 1-9.

Deathswitch, Bridging Mortality, What is a deathswitch?, http://www.deathswitch.com/, Apr. 17, 2013, 1 page.

Dead Man's Switch, http://www.deadmansswitch.net/, Apr. 17, 2013, 1 page.

* cited by examiner

FIG. 1

| |
|---|
| 100 step of determining if a user is responsive |
| 101 step of allowing a user to engage in a number of on-line activities |
| 103 step in allowing the user to engage in a number of external on-line activities |
| 110 step of initializing the personal monitoring module |
| 112 step of allowing the user to access the personal monitoring module |
| 114 step of allowing the user to provise the identification data to the personal monitoring module |
| 115 step of storing the user's identification data |
| 116 step of providing the personal monitoring module with access to the user's on-line activities external to the personal monitoring module |
| 118 step of allowing the user to select a passive interval, or time period, between the determination of whether the user engaged in on-line activities |
| 120 step of allowing the user to identify a proxy |
| 122 step of allowing the user to establish a user response time |
| 123 step of allowing the user to establish a user response time |
| 124 step of allowing the user to establish a proxy response time |
| 130 step of allowing the user to identify a number scripted actions |
| 132 step of allowing the user to identify a number of primary actions |
| 134 step of allowing the user to identify a number of secondary actions |

SYSTEM AND COMPUTER IMPLEMENTED METHOD OF PERSONAL MONITORING

BACKGROUND OF THE INVENTION

1. Field of the Invention

The disclosed and claimed concept relates to a computer implemented method of monitoring a user's on-line activities and, more specifically, to a method wherein the user or a proxy is allowed to indicate the user is still engaging in on-line activities.

2. Background Information

On-line activities are a daily occurrence in many peoples' lives. That is, many people use email, electronic banking, social networks, gaming, not to mention simple web surfing. The on-line accounts and other tools related to such on-line activities, however, survive the death or incapacitation of the user. Many users would prefer to control their on-line accounts and tools related to such on-line activities in the event of their death or incapacitation.

Systems and methods have been developed that provide some control of on-line accounts and tools related to such on-line activities in the event of a death or other form of incapacitation. Such systems, or modules (i.e., generally, software) perform an investigation to determine if the user is able to provide a response. These systems and methods, however, are limited. For example, one system and method requires the user to identify a specific date, or range of dates, when the investigation will occur, e.g. May 1-May 6 which, for example, may be each day the user is on vacation. Further, these systems are limited to internal interactions. That is, the user must be utilizing the program, site, or other electronic construct that incorporates the investigation system or modules. Thus, if a user does not access the system/module incorporating the investigation module, then the user cannot satisfy the investigation.

SUMMARY OF THE INVENTION

The disclosed and claimed concept provides for a system and computer implemented method of personal monitoring including the steps of: allowing a user to engage in a number of on-line activities, determining, on a computer, if the user engaged in on-line activities, and if the determination is negative, then performing, on a computer, a number of responsive actions. The system and method further provide for an investigation of external modules; that is, the system and method investigate external sites such as, but not limited to, social networks, forums, weblogs (blogs), that are not associated with the personal monitoring module. The system and method further allow a proxy to respond for the user. The system and method further allow the proxy direct access thereby enabling the proxy to inform the system that the user is dead, or otherwise incapacitated, thereby initiating the number of responsive actions.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, a "computer" is a device structured to process data having at least one input device, e.g. a keyboard, mouse, or touch-screen, at least one output device, e.g. a display, a graphics card, a communication device, e.g. an Ethernet card or wireless communication device, permanent memory, e.g. a hard drive, temporary memory, i.e. random access memory, and a processor, e.g. a programmable logic circuit. The "computer" may be a traditional desktop unit but also includes cellular telephones, tablet computers, laptop computers, as well as other devices, such as gaming devices that have been adapted to include components such as, but not limited to, those identified above. Further, the "computer" may include components that are physically in different locations. For example, a desktop unit may utilize a remote hard drive for storage. Such physically separate elements are, as used herein, a "computer."

As used herein the word "display" means a device structured to present a visible image.

As used herein a "computer readable medium" includes, but is not limited to, hard drives, CDs, DVDs, magnetic tape, floppy drives, and random access memory.

As used herein, "permanent memory" means a computer readable storage medium and, more specifically, a computer readable storage medium structured to record information in a non-transitory manner. Thus, "permanent memory" is limited to non-transitory tangible media.

As used herein, "stored in the permanent memory" means that a module of executable code, or other data, has become functionally and structurally integrated into the storage medium.

As used herein a "file" is an electronic storage means for containing executable code that is processed, or, data that may be expressed as text, images, audio, video or any combination thereof.

As used herein, a "module" is a construct used by a computer and includes, but is not limited to, a computer file or a group of interacting computer files such as an executable code file and data storage files, used by a processor and stored on a computer readable medium. It is understood that modules may be identified by their purpose of function. For example, "email," when not referring to a specific message, means an email module and a "social network" means a module that is structured to operate as a social network web site or similar construct.

As used herein, "structured to [verb]" when used in relation to a module, means that the module includes executable computer instructions, code, or similar elements that perform the identified task.

As used herein, a "scripted" action is a number of commands performed by a module.

As used herein, unless otherwise noted, a step of "allowing" a user to perform an action includes presenting to the user a user interface that is structured to accomplish the identified step upon input from the user. It is understood that the input from the user is stored. For example, a step of "allowing a user to identify a proxy" means that the user is presented an input field and provided instructions to enter the name of a proxy. Further, once the name is entered in the input field, the name is stored. An exception to this definition is "allowing a user to engage in a number of on-line activities," or similar terms, which further means the user is not inhibited from performing any external activities on-line.

As used herein an "electronic communication network" includes any system of linked computers such as the Internet, an Intranet, or a school or company network.

As used herein, a "moniker" is an identifier for a user. "Monikers" include, but are not limited to, usernames, email addresses, sign in names, login names, screen names, user IDs, and handles. A "moniker" may be an alias or false name.

As used herein, a "page" means an electronic construct stored and presented according to the HTML (the Hypertext Markup Language) and HTTP (the Hypertext Transfer Protocol) standards. The page may be static or interactive and is structured to be displayed on a computer monitor. It is understood that pages may be created on one computer and transmitted electronically to a display or another computer. Thus, information/pages may exist even in the absence of a monitor. That is, pages may exist solely as an electronic construct. Unless otherwise noted, a page is communicated to the user via a display, or other computer output device. That is, a page is "presented" to a user via a computer having a display, or other computer output device.

As used herein, to "select" or to "click on" an option on a page means to use an input device, such as a mouse, to communicate to the computer which option and/or link on the page is to be actuated.

As used herein, a "button" on a page is an area of the image that may be selected or clicked on to cause the program to provide additional data or display a new page.

Figure 1:
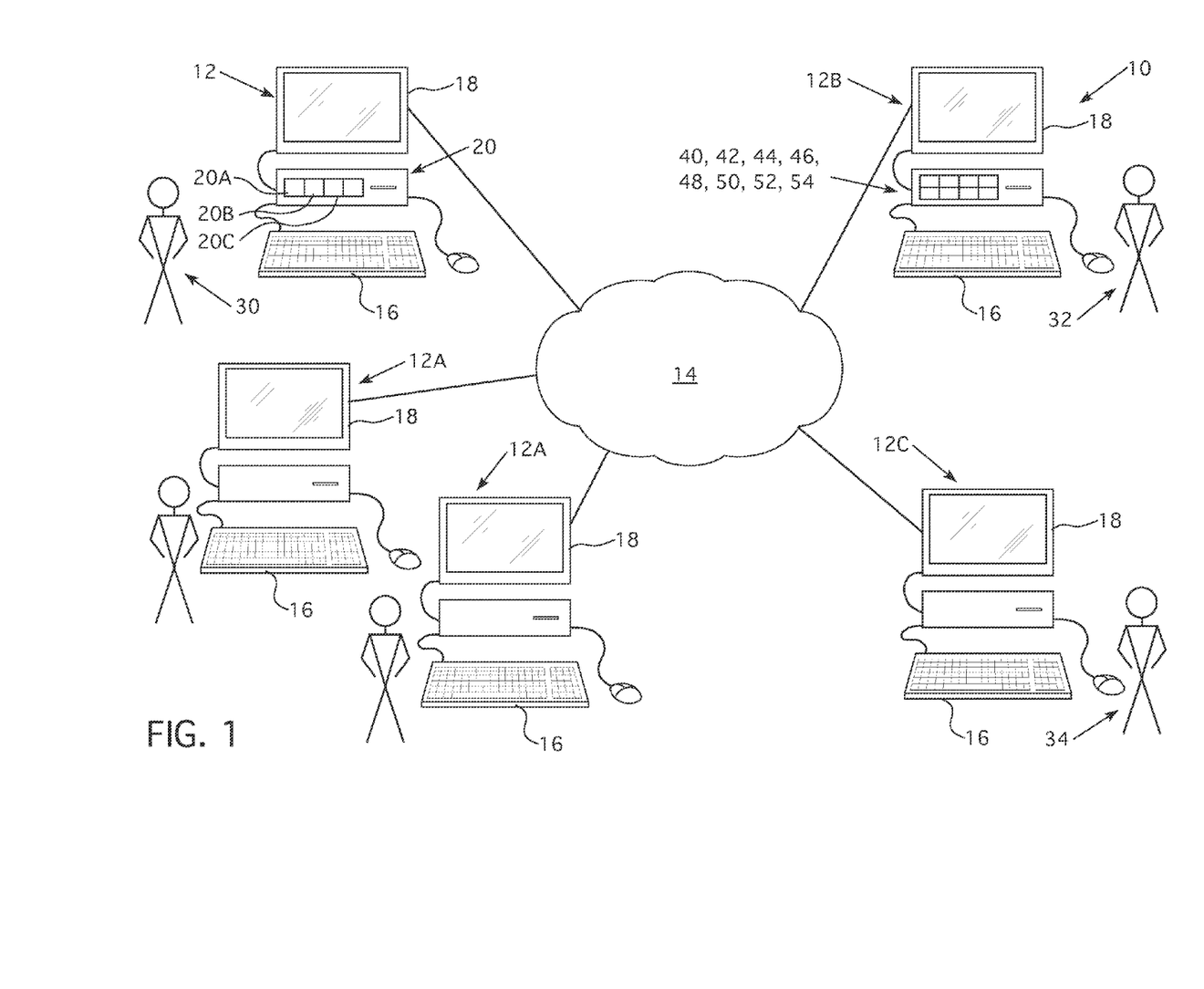
FIG. 1 is a schematic view of a computer system.

The disclosed system 10 and method utilize computers 12 and an electronic network 14 such as, but not limited to, the Internet. As is known, a computer 12 includes various elements such as, but not limited to, at least one input device, e.g. a keyboard 16, mouse, or touch-screen, at least one output device, e.g. a display 18, a graphics card, a communication device, e.g. an Ethernet card or wireless communication device, permanent memory, e.g. a hard drive, temporary memory, i.e. random access memory, and a processor, e.g. a programmable logic circuit (selected elements not shown). In an exemplary embodiment, a number of programs or modules 20 are stored in permanent memory. In an alternate embodiment, selected modules 20 are downloaded to temporary memory. For example, a web browser module 20A is, in an exemplary embodiment, stored in the permanent memory of the user's computer 12. As is known, use of the web browser module 20A allows a user to download other modules 20 to the user's computer 12 to be viewed or executed. Such downloaded modules 20 are stored in the permanent memory of another computer such as, but not limited to the provider's computer 12C.

Generally, the user utilizes an interaction module 209 to interact with remote computers 12. Interaction modules 20B include, but are not limited to, a web browser module 20A as noted above, an e-mail module 20C, and an application module typically associated with a smartphone, e.g. a social network "app" (not shown). Further, a module 20 includes websites, such as, but not limited to, a social network website, which is downloaded and presented via a web browser module 20A. Further, as used herein, related modules 20 are "internal" relative to each other. That is, for example, when a web browser module 20A accesses asocial network website, in an exemplary embodiment, the social network website module 20 includes related modules 20 such as, but not limited to, a messaging module, an uploading module, a newsfeed module, etc. (none shown) each of which are presented to the user via the web browser module 20A. Such related modules 20 are "internal" relative to the social network website module 20. Further, as used herein, unrelated modules 20 are "external" relative to each other. For example, two interaction modules 20B that do not share data in the absence of a user action, e.g., a web browser module 20A and an email module 20C, such as, but not limited to Microsoft Internet Explorer® and Microsoft Outlook®, both from Microsoft Corporation Corp. One, Microsoft Way, Redmond, Wash., generally operate independent of each other and are unrelated and, therefore, "external" to each other. Such "external" modules may still cooperate for ease of use. For example, while in a web browser module 20A, a user 30 may click on an email address thereby launching the email module 20C and inserting the clicked upon email address in the "To:" field of the email message. This is an example of external modules sharing data in response to a user 30 action.

Further, as used herein, websites having different domains are "external" to each other, and, websites are "external" to the web browser module 20A on which they are presented. Conversely, websites having the same domain are "internal" to each other. Thus, for example, all the modules 20 related to a specific social network website are "internal" relative to each other. Further, modules 20 provided by one entity that share data independent of a user action are "internal" to each other. For example, the email service "G-mail®" and the social network "Google+®," both provided by Google Inc., 1600 Amphitheatre Parkway, Mountain View, Calif., are "internal" to each other in that, in the absence of a user action, the modules share data with each other. That is, for example, a user's 30 G-mail® and Google+® contact list (email addresses) are shared without a specific action by the user 30.

As shown schematically in FIG. 1, the system 10 for monitoring personal activity, hereinafter "personal monitoring" relies upon the interaction of a number of computers 12, 12A, 12B, 12C. The system 10, however, is, in an exemplary embodiment, substantially disposed on a single computer 12B as set forth below. In an exemplary embodiment, and for the sake of an example, in the following description, the first computer 10 is operated by a "user" 30. As used herein, a "user" 30 is a person that utilizes the personal monitoring service. The user uses the first computer 12 to electronically communicate with others and interacts with various services via modules 20 associated with email, social network website, etc., collectively represented by the second computer 12A. The service provider 32 operates the third computer 12B that hosts the personal monitoring service. The personal monitoring service is performed by a number of modules 20, structured to perform as described below, and which are stored, and in an exemplary embodiment, stored in the permanent memory of the third computer 12B. The fourth computer 12C is used by a "proxy" 34. As used herein, a "proxy" 34 is a person designated by the user 30 to act on the user's behalf, as detailed below.

The service provider 32 utilizes the third computer 12B that executes a personal monitoring module 40. The service provider third computer 12B is in electronic communication with the electronic network 14 The personal monitoring module 40, in an exemplary embodiment, includes a number of modules 20 such as, but not limited to, a communication module 42, an interface module 44, a number of database modules 46, an administration module 48, an investigation module 50, a verification module 52 and a response module 54. In an exemplary embodiment, the verification module 52, is part of the response module 54 in that the steps relating to verification, described below, are an initial response. As is generally known, the communication module 42 is structured to allow the personal monitoring module 40 to communicate with other computers 12 via the electronic network 14. The interface module 44 is structured to create the user interface presented to the user 30 on the user's computer 12. The database modules 46 are structured to store data including, but not limited to, data specific to each user 30, i.e. names, passwords, bitting information, and investigation data. A database module 46 may be associated with, or incorporated into, any other module 20. Alternatively, or in addition thereto, any module 20 can be structured to access a database module 46. The administration module 48 is structured to process information such as, but not limited to, account information, i.e. requesting a user's identification (username and password. These modules 42, 44, 46, 48 and their functions are well known in the art. Further, in an exemplary embodiment, interaction between the user 30, or the proxy 34, and the personal monitoring module 40 occurs via the communication module 42 and interface module 44 which interact with other modules 20, 42, 46, 48; specific reference to the communication module 42 and interface module 44 will not be made below.

Generally, and as described in detail below, the user 30 electronically contacts the service provider 32. In an exemplary embodiment, the user 30 utilizes the first computer 12 and a web browser module 20A to electronically communicate, via the electronic network 14, with the third computer 12B. The user 30 provides the personal monitoring module 40, and, in an exemplary embodiment, the administration module 48, with identification data about their on-fine activities such as, but not limited to, the user's moniker(s) or username(s) for social networks, blogs, forums, and other web sites, the user's email address(es) and similar electronic identifiers as well as identifying the social networks, blogs, forums, and other web sites commonly used by the user 30. This information is hereinafter collectively named, and as used herein, "identification data." Stated alternately, the administration module 48 is structured to receive and the database module 46 is structured to store, the user's identification data. The identification data is stored in a database module 46. At selected intervals, the investigation module 50 investigates the user identified sites to determine if the user has engaged in any on-line activity. If the determination is positive, i.e. the investigation module 50 finds evidence that the user 30 has been active, a new time period before a subsequent investigation is established, but generally, no other action is taken. If the investigation module 50 determines that there is a lack of online activity, the verification module 52 attempts to verify the user 30 is active.

That is, the verification module 52 is structured to contact the user 30 and to contact the proxy 34. In an exemplary embodiment, the user 30 identifies the verification path. That is, the user 30 is allowed to identify a preferred method of communication for the verification module 52. The verification module 52 attempts to contact the user 30 via email or a similar communication used by the user's 30 on-line sites. For example, a social network site may include an instant messaging service. For such a site, the verification module 52 sends an instant message as a verification message. The verification message may be sent repeatedly on a short cycle, such as, but not limited to, every fifteen minutes. If such messages can be deleted, the verification module 52 is structured to delete past verification messages so that the user's message service does not become filled with multiple verification messages. If the attempt to contact the user 30 succeeds, a new time period before a subsequent investigation is established, but generally, no other action is taken. If the attempt to contact the user 30 fails, the response module 54 is structured to perform a number of selected scripted actions, or a number of primary selected scripted actions. Such actions include, but are not limited to, notifying selected persons, locking accounts, deleting files for various modules, transmitting files to selected persons, clearing browser module 20A history, executing scripts on target computers 12, and unlocking accounts.

In another embodiment, if the attempt to contact the user 30 fails, the verification module 52 attempts to contact the proxy 34. That is, the service provider 32 utilizes the third computer 12B to electronically communicate, via the electronic network 14, with the proxy's fourth computer 12C. In one exemplary embodiment, if the attempt to contact the proxy 34 succeeds, a new time period before a subsequent investigation is established, but generally, no other action is taken. In another exemplary embodiment, if the attempt to contact the proxy 34 succeeds, the response module 54 performs a second set of selected actions. The second set of selected actions may be the same as the first set of actions, but typically the user 30 will identify a more limited set of selected actions for the second set of selected actions.

In an exemplary embodiment, a user 30 creates an account with the service provider 32. This is accomplished by the user 30 utilizing the first computer 12 to electronically communicate, via the electronic network 14, with the third computer 12B. The administration module 48 is structured to collect information from the user 30 and to assign, or allow the user 30 to select, a username. The user's data is stored in the database module 46. As is known, the administration module 48 is structured to perform other functions such as, but not limited to, assigning, or allow the user 30 to select, a password associated with the account, tracking usage by the user 30, billing the user 30, and other administrative functions. Further, the administration module 48 is structured to allow the user 30 to identify a selected period of time between investigations and the method of verification, described below.

The administration module 48 is also structured to allow the user 30 to identify a number of proxies 34. Stated alternately, the administration module 48 is structured to receive, and the database module 46 is structured to store, the identification data for a number of proxies 34, such as, but not limited to, an email address for each proxy 34. For the description below, unless otherwise noted, it is assumed that there is a single proxy 34. It is understood that the description related to the single, described proxy 34 is generally applicable to all proxies 34.

The administration module 48 is further structured to allow the user to establish a user response time and a proxy response time. Stated alternately, the administration module 48 is structured to receive, and the database module 46 is structured to store, a user response time and a proxy response time. The user response time is the time period between the verification module 52 sending a verification message to the user 30 and activating the response module 54, as discussed below. Similarly, the proxy response time is the time between the verification module 52 sending a supplemental verification message to the proxy 34 and activating the response module 54, as discussed below. It is noted that when there are multiple proxies 34, each proxy 34 is assigned their own proxy response time, or, all proxies 34 may be assigned the same proxy response time. Further, the proxy response times may run simultaneously or consecutively, as described below. The administration module 48 is further structured to assign, or allow the user 30 or the proxy 34 to select, a username for the proxy 34 (hereinafter "proxy username"). The proxy's data is stored in the database module 46. The administration module 48 is structured to perform other functions such as, but not limited to, assigning, or allow the proxy 34 to select, a password (hereinafter "proxy password"). Further, as is known in the art, a user 30, or a proxy 34, may access the personal monitoring module 40 and interact therewith by logging-on, i.e. accessing the personal monitoring module 40 via the communication module 42, and providing a username and/or password.

The user 30 further provides identification data related to the user's 30 on-line activities. In an exemplary embodiment, the user 30 provides identification data such as the user's email address (or addresses), social network information such as, but not limited to various user names and, if required, a password for each email account or social network, a cellular telephone number, and any other contact information for various devices/computers. The user 30 also provides identification data related to their on-line activities on web logs (blogs) and electronic communities (forums, chat rooms, etc.). The user 30 further provides information account information, including passwords, for use by the response module 54. This information includes, but is not limited to, email address and/or telephone numbers for emergency contacts, information required to access financial accounts, information required to access the first computer 12. All information is stored in the database module 46.

Further, the administration module 48 is structured to receive an input from the user 30, or a proxy 34, that initiates the response module 54 to perform a number of sets of selected scripted actions, as discussed below. That is, for example, the proxy 34 may learn that the user 30 is incapacitated and, rather than wait for an investigation, as discussed below, the proxy 34 can actively initiate the response module 54 by accessing, i.e. logging in to, the personal monitoring module 10.

The investigation module 50 is structured to investigate a user 30 and to determine if the user has engaged in an on-line activity within a selected period of time, hereinafter the "investigation period." As used herein, an "investigation" is the process of the investigation module 50 checking the user's on-line activities during the investigation period. That is, the investigation module 50 is structured to perform a number of investigations of the electronic network 14 to determine if the user 30 has engaged in any on-line activity. In an exemplary embodiment, the investigation module 50 is structured to perform a passive investigation. That is, as used herein, a "passive investigation" is an investigation initiated by the investigation module 50 without a specific direction from the user. In an exemplary embodiment, the "passive investigation" occurs a selected time period after the most recent investigation resulting in a positive response, i.e. an investigation that established the user 30 had engaged in an on-line activity. For example, an initial passive investigation occurs a selected time period after the user 30 first activates their account. In one exemplary embodiment, the first passive investigation occurs about four weeks after the user 30 first activates their account and every four weeks thereafter. In another exemplary embodiment, e.g. for a person with health issues, the passive investigation occurs about once or twice a day. If the investigation determines that the user 30 has engaged in an on-line activity within the time period between activation and the investigation, a positive result is determined and recorded. The investigation module 50 then schedules another investigation to occur and the personal monitoring module 40 performs no other actions. In an exemplary embodiment, the investigations occur on a regular cycle, such as, but not limited to, every day or every four weeks. In an alternative embodiment, the passive investigation occurs at a selected date, e.g. the first of each month. In a "passive investigation" the user 30 does not schedule a specific investigation time or identify a limited period in which the investigation occurs, e.g. every day between May 1 and May 5 or every day when the user 30 is on vacation.

In an exemplary embodiment, the investigation module 50 is structured to check on the user's 30 external on-line activities. That is, the investigation module 50 is structured to check one of the user's public on-line activities or private on-line activities. Stated alternately, the investigation module 50 is structured to perform one of a public investigation or a private investigation For a public investigation, the investigation module 50 initially accesses the user's 30 account and identifies and logs (e.g. makes a record in the database) the user's identification data. The investigation module 50 is further structured to identify monikers, as discussed above, on public blogs, public portions of social networks, public forums, and similar sites as well as the date on which the moniker was used. The investigation module 50 then accesses the electronic network 14 via the communication module 42 and searches for evidence of the user 30 engaging in any public on-line activity. That is, for a public search, the investigation module 50 does not access the user's 30 private accounts, such as, but not limited to, an email account or a social network account. Instead, the investigation module 50 searches public information, such as, but not limited to, public blogs, public portions of social networks, public forums and similar sites. The investigation module 50 is further structured to compare the identification data to the monikers found on the electronic network 14 and to determine if the monikers found on the electronic network 14 were used during the investigation period.

If the investigation module 50 finds that the identification data was used during the investigation period, the investigation module 50 determines that the user has engaged in on-line activity. That is, as used herein, the investigation returns a "positive result" or makes a "positive determination." Upon a positive determination, the investigation module 50 starts a new investigation period, and generally takes no other action. In one embodiment, the investigation module 50 is structured to alert the user 30, or the proxy 34, that an investigation has been successfully completed, e.g. via an e-mail.

If the investigation module 50 finds that the identification data was not used during the investigation period, the investigation module 50 determines that the user has not engaged in on-line activity. That is, as used herein, the investigation returns a "negative result" or makes a "negative determination." Upon a negative determination, the investigation module 50 activates the verification module 52, as discussed below.

For a private investigation, the investigation module 50 initially accesses the user's 30 account and identifies and records logs selected data such as, but not limited to, the user's username(s) for social networks, blogs, forums, and similar electronic activities as well as various passwords. The investigation module 50 is structured to then access the user's accounts. That is, the investigation module 50 will, in an exemplary embodiment, log into a user's email account or social network account. Further, the investigation module 50 is structured to determine if such accounts have been utilized within the investigation period. For example, the investigation module 50 is structured to determine if an email has been sent from the user's email account within the investigation period, or, if the user has accessed a social network account within the investigation period. As before, if the investigation module 50 finds evidence of user activity during the investigation period, the investigation module 50 makes a positive determination, or, if the investigation module 50 does not find evidence of user activity during the investigation period, the investigation module 50 makes a negative determination. Upon a positive determination, the investigation module 50 starts a new investigation period, but takes no other action. Upon a negative determination, the investigation module 50 activates the verification module 52.

The verification module 52 is structured to alert the user 30 of the lack of on-line activities. The verification module 52 is further structured to request a response from the user 30 within the user response time and, if the response is received, to identify the response as an on-line activity. In an exemplary embodiment, the verification module 52 is structured to create and send the user 30 a verification message, such as but not limited to, an email or text message. In an exemplary embodiment, within the user's account information are a number of user contacts, e.g. email addresses and telephone numbers. The user 30 identifies a number of the contacts as a verification contact(s). The verification module 52 communicates with the verification contact. In an exemplary embodiment, the user 30 selects a verification path or method. For example, the user 30 can select to be alerted by a text message, i.e. a verification message, sent to the user's cellular telephone. Further, the user 30 selects a method of verification response. The method of verification response may be "passive" or "active." That is, in an exemplary embodiment and utilizing a "passive" method of verification response, the user 30 simply engages in an on-line activity after receiving a verification message. For example, the user 30 may verify their presence by engaging in an on-line activity, such as, but not limited to, utilizing a social network site. As part of the verification process, the verification module 52 is structured to initiate the investigation module 50 and can decrease the time span of the investigation period. Such a shortened investigation period is identified as a "verification investigation period." For example, a verification investigation period, in an exemplary embodiment, is set to every fifteen minutes. The user 30 further identifies a maximum number of verification investigation periods be ninety-six, e.g. a 24-hour span, which is the user response time. As before, the investigation module 50 makes a positive determination or a negative determination regarding the user's presence on-line and either resets the investigation module 50 or causes the verification module 52 to initiate the response module 54, as described below.

In another exemplary embodiment, utilizing an "active" verification response, the verification module 52 is structured to generate a verification page, i.e. a web page or similar construct. The verification page, in an exemplary embodiment, includes a verification input field. In this embodiment, the verification message includes link to the verification page and a verification code. When a user activates the link and accesses the verification page, the user is requested to enter the verification code in the verification input field. When the user enters the verification code in the verification input field, the verification module 52 communicates with the investigation module 50 which, in turn, makes a positive determination of on-line activity and starts a new investigation period. If the user does not enter the verification code in the verification input field within a selected time period, i.e. the user response time, the verification module 52 activates the response module 54. Thus, as used herein, a "passive verification response" means that the user 30 verifies their on-line activity via an external on-line activity. Conversely, as used herein, an "active verification response" means that the user 30 verifies their on-line activity via direct communication with the personal monitoring module 40.

In an alternative embodiment, the user provides a verification code as part of setting up the account. That is, the administration module 48 requests and the database module 46 stores the verification code. In this embodiment, the verification code may be in the form of an answer to a selected question, such as, but not limited to, "what is your mother's maiden name," or, "what was your first pet's name." Further, the verification module 52, in other embodiments, uses other forms of verification of on-line activities. For example, the verification may be, but is not limited to, sending an email with an electronic return receipt. That is, the verification module 52 generates a verification email, e.g. via an email module (not shown), with an electronic return receipt. When the user opens the verification email, the return receipt is returned to the verification module 52 thereby confirming an on-line activity by the user 30.

In an alternate embodiment, the verification module 52 is structured to accept a verification from a proxy 34. That is, the verification module 52 is structured to alert the proxy 34 of the lack of on-line activities by the user 30. The verification module 52 is further structured to request a response from the proxy 34 within the proxy request time and, if the response is received, to identify the response as an on-line activity by the user 30. In an exemplary embodiment, the verification module 52 initially sends a verification message to the user 30 as described upon. If the user 30 fails to respond to the verification message within a selected time period, the verification module 52 sends a supplemental verification message to the proxy 34. In an exemplary embodiment, the supplemental verification message operates in a manner similar to the initial verification message. That is, the verification module 52 is structured to generate a supplemental verification page. The supplemental verification page, in an exemplary embodiment, includes a verification input field. In this embodiment, the supplemental verification message includes a link to the supplemental verification page and a supplemental verification code. When the proxy 34 activates the link and accesses the supplemental verification page, the proxy 34 is requested to enter the supplemental verification code in the verification input field. When the proxy 34 enters the supplemental verification code in the verification input field, the verification module 52 communicates with the investigation module 50 which, in turn, makes a positive determination of on-line activity by the user 30 and starts a new investigation period. If the proxy 34 does not enter the verification code in the verification input field within a selected time period, i.e. the proxy response time, the verification module 52 initiates the response module 54.

In an alternate embodiment, the verification module 52 is structured to contact the proxy 34 before contacting the user 30. That is, the verification module 52 contacts the proxy 34 as described above. If the proxy 34 does not respond within the proxy response time, the verification module 52 is structured to contact the user 30, as described above.

When the verification module 52 fails to receive a verification from the user, the verification module 52 activates the response module 54. That is, for example, if the user 30 has selected a passive verification response, the verification module 52 performs, via the investigation module 50, an investigation of the user 30 up to the maximum number of verification investigation periods and then initiates the response module 54. In an embodiment wherein the verification module 52 is part of the response module 54, the verification module 52 initiates a further response from the response module 54. The response module 54 is structured to perform a number of scripted actions. In an exemplary embodiment, the response module 54 is structured to perform a number of sets of selected scripted actions on external modules 20. That is, modules 20 that are not part of the personal monitoring module 40. Such external modules 20 include, but are not limited to email and social networks.

In an exemplary embodiment, the response module 54 is structured to acquire the user's information, such as, but not limited to, the user's emergency contacts and related contact information, the user's usernames and passwords, from the database module 46. The response module 54 is further structured to perform a number of scripted actions related to the user's information. In an exemplary embodiment, the response module 54 contacts the user's emergency contacts via the contact information and alerts the emergency contacts that the user 30 has failed to respond to the verification message. In an exemplary embodiment, the response module 54 is further structured to access the user's computer(s) and delete files related to web browser module 20A, such as, but not limited to, browser history, cookies, and temporary files. In an exemplary embodiment, the response module 54 is further structured to delete files and/or folders, execute a module 20 on a target computer 12 that wipes, i.e. unrecoverable deleting, all or portion of data, send files or predefined emails such as instructions to access account, user names, passwords, account locations, etc. The response module 54 is further structured to post or updates status on social media accounts and any and all electronic/digital actions predetermined by user 30. In an exemplary embodiment, the number of scripted actions occur in modules 20 external to the personal monitoring module 40.

The response module 54 is structured to allow access by the user 30, or the proxy 34, and to perform a number of scripted actions related to the user's information. That is, the user may desire to intentionally initiate the number of scripted actions, e.g. prior to a vacation or stay at a hospital. Alternatively, the proxy 34 may become aware that the user 30 has passed away or has become incapacitated and initiate the number of scripted actions. In these instances, the user 30 or the proxy 34 sends an instruction to the response module 54 initiating the scripted actions.

Figure 2A:
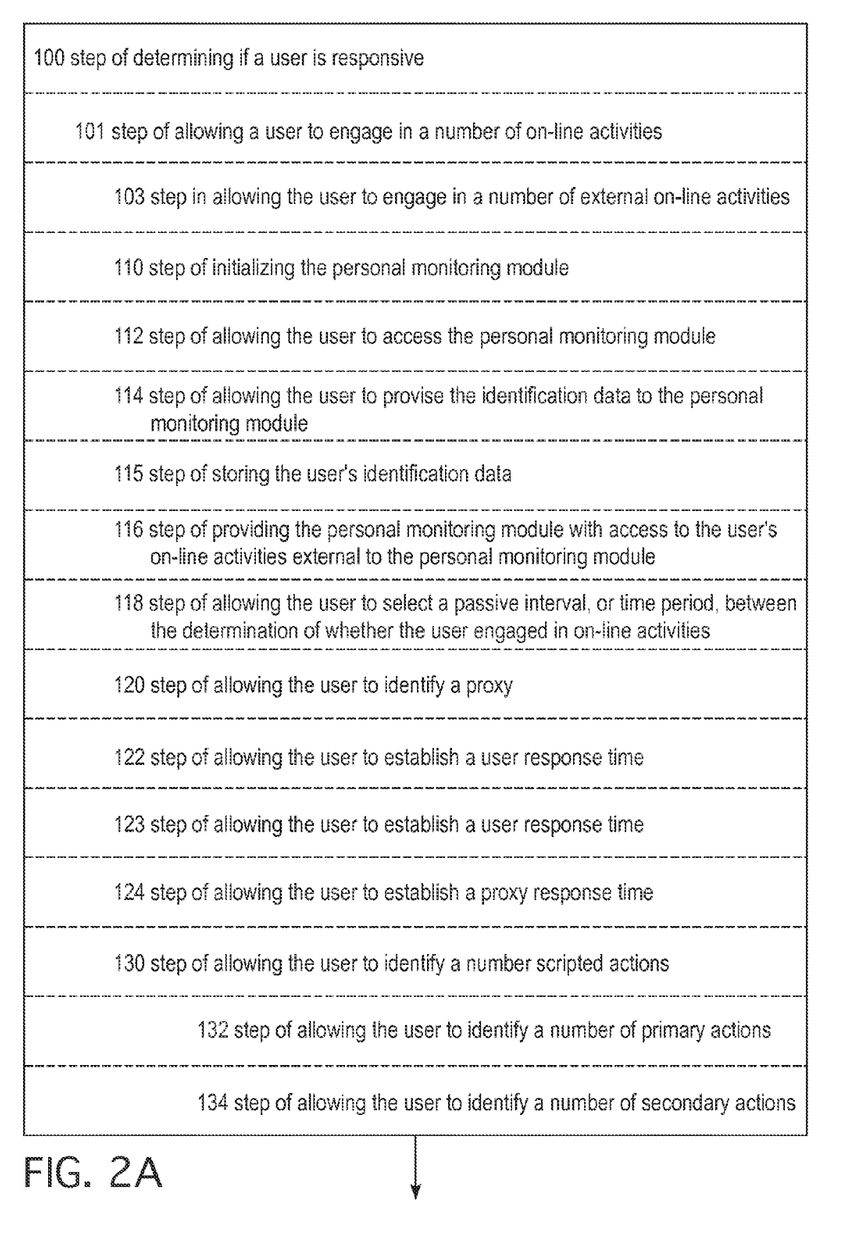
FIGS. 2A, 2B, and 2C are a flow chart of the steps associated with the method.
Figure 2B:
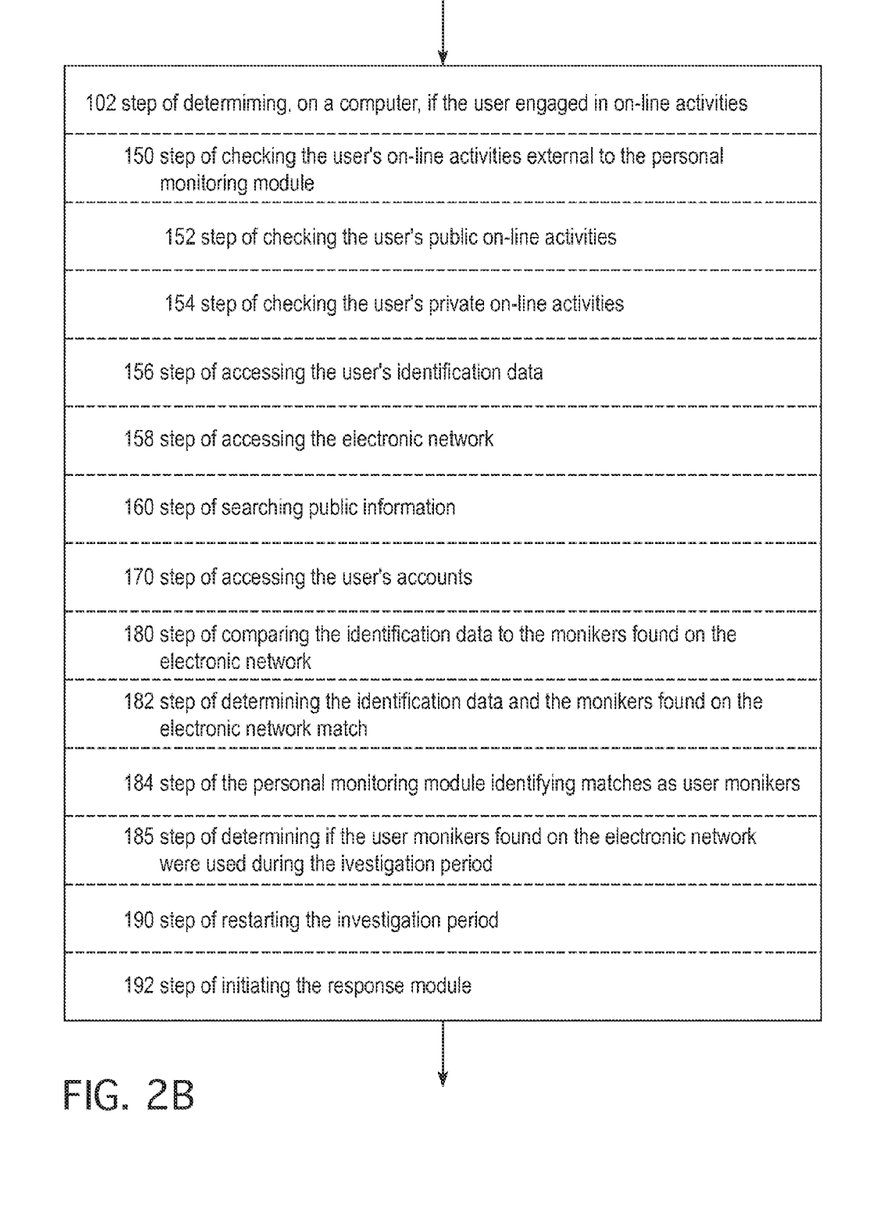
Figure 2C:
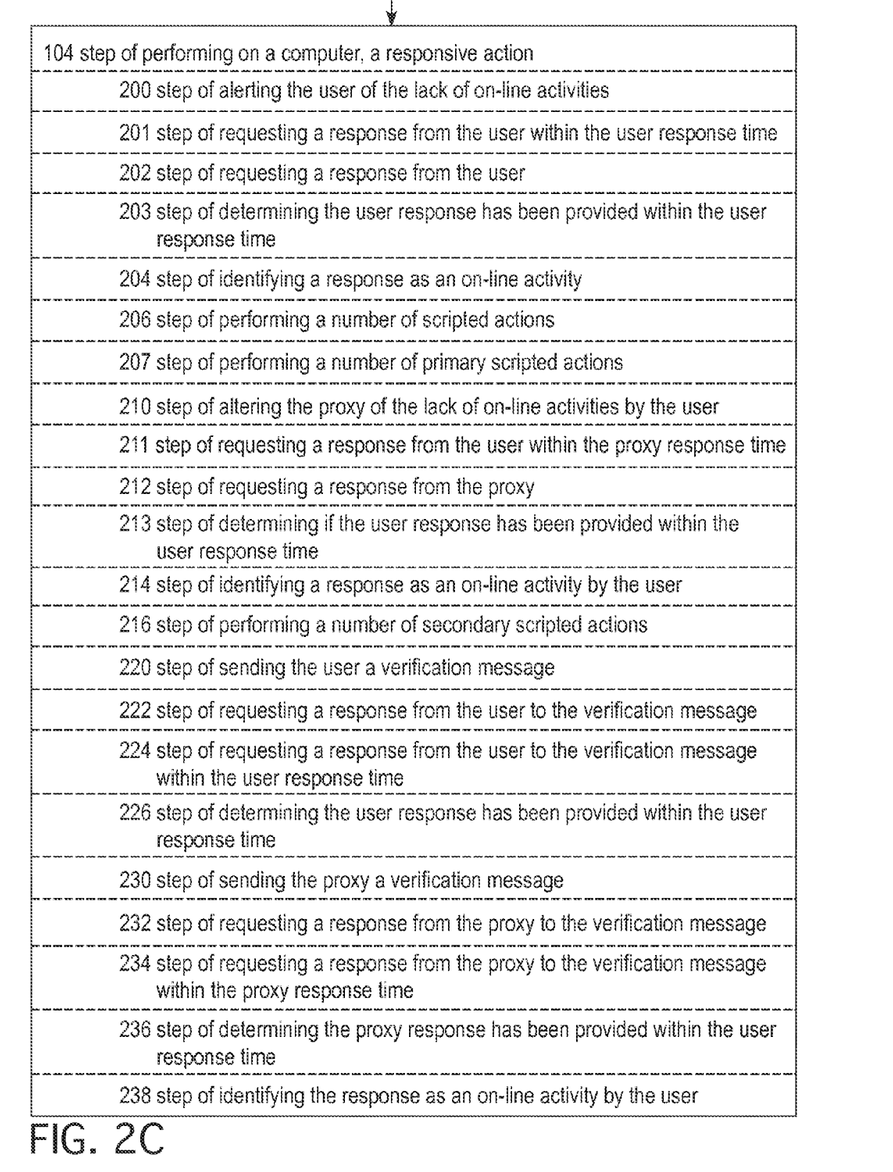

Accordingly, the personal monitoring module 40 is used to perform a method of personal monitoring including the steps of determining 100 if a user is responsive and, if the determination is negative, then performing 104, on a computer, a number of responsive actions. The step of determining 100 if a user is responsive includes allowing 101 a user to engage in a number of on-line activities, determining 102, on a computer, if the user engaged in on-line activities, and if the determination that the user engaged in on-line activities is negative, then performing 104 the number of responsive actions. The step of determining 100 if a user is responsive further, or alternatively, includes the step of receiving 106 an instruction. The instruction can be sent by the user 30 or the proxy 34, as described below. The step of allowing 101 a user to engage in a number of on-line activities includes the step of initializing 110 the personal monitoring module 40. The step of initializing 110 the personal monitoring module 40 includes the steps of allowing the user to access 112 the personal monitoring module 40, allowing the user to provide 114 identification data to the personal monitoring module 40, and in an exemplary embodiment, to the administration module 48, wherein the identification data relates to, or details, the user's 30 external on-line activities including data such as, but not limited to, usernames, monikers or other identifiers and sites that are utilized. The step of initializing 110 the personal monitoring module 40 further includes the step of storing 115 the user's identification data.

Further, the step of initializing 110 the personal monitoring module 40 includes the step of allowing 120 the user 30 to identify a proxy 34. In association with identifying a proxy 34, the user 30, or the proxy 34, is allowed to provide 114A proxy identification data to the personal monitoring module 40. That is, the user 30 is allowed to identify, for example, a proxy username and password. Such information would then be communicated by the user 30 to the proxy 34 by any known method of communication. As is known, the proxy username and password may be temporary and be deleted after a period of time. That is, the proxy 34 is allowed to access the personal monitoring module 40 and change some proxy identification data, such as, but not limited to, the proxy user name and proxy password. If the proxy 34 does not update the proxy username and proxy password within a selected period of time, the temporary proxy username and password are deleted. The step of initializing 110 the personal monitoring module 40 further includes the step of storing 115A the proxy identification data.

The step of allowing the user to provide 114 identification data to the personal monitoring module 40, including information about the user's 30 external on-line activities, is associated with the step of providing 116 the personal monitoring module 40 with access to the user's on-line activities external to the personal monitoring module 40. The step of initializing 110 the personal monitoring module 40 further includes the step of allowing 122 the user 30 to establish 117 a path for response. As used herein a "path for response" means the computer 12 (which as noted above, includes cellular telephones and/or the module 20 used to communicate a verification message to the personal monitoring module 40, as discussed below.

The step of initializing 110 the personal monitoring module 40 further includes the step of allowing 122 the user 30 to establish a user response time, and, allowing 124 the user 30 to establish a proxy response time. The user response time and the proxy response time are associated with the steps 202, 212 of requesting a response from the user 30 and proxy 34 as discussed below.

The step of allowing 101 a user to engage in a number of on-line activities further includes allowing 103 the user to engage in a number of external on-line activities such as, but not limited to, utilizing social networks, communicating with, i.e. leaving comments on, electronic forums, utilizing blogs, utilizing commercial sites and leaving comments, and similar activities. Generally, the user utilizes the first computer 12 to electronically communicate, via the electronic network 14, with a number of second computers 12A.

The step of initializing 110 the personal monitoring module 40 further includes the step of allowing 118 the user to select a passive interval, or time period, between the determination 102 of whether the user engaged in on-line activities, as described below. That is, the user 30 is allowed to select the passive investigation period. As noted above, the step of initializing 110 the personal monitoring module 40 includes the step of allowing 120 the user 30 to identify a proxy 34. Further, the step of initializing 110 the personal monitoring module 40 includes the step of allowing 130 the user 30 to identify a number of scripted actions. The number of scripted actions includes a number of primary actions and a number of secondary actions. That is, the user 30 is allowed 132 to identify a number of primary actions and allowed 134 to identify a number of secondary actions. The user 30 is then allowed 101 to engage in a number of on-line activities external to the personal monitoring module, as noted above. Further, if there is more than one proxy 34, the step of initializing 110 the personal monitoring module 40 includes the step of allowing 124 the user 30 to establish a proxy response time for each proxy 34 as well as allowing 126 the user 30 to establish the scheduling of the proxy response times. That is, for example, the user 30 may allow the proxies to respond in sequence or simultaneously.

The step of determining 102, on a computer, if the user engaged in on-line activities includes the step of checking 150 the user's 30 on-line activities external to the personal monitoring module. The step of checking 150 the user's 30 on-line activities external to the personal monitoring module includes the steps of checking 152 the user's public on-line activities and the step of checking 154 the user's private on-line activities, i.e. a public investigation or a private investigation. The step of checking 1152 the user's public on-line activities includes the steps of accessing 156 the user's identification data, accessing 158 the electronic network 14 and searching 160 public information, such as, but not limited to, public blogs, public portions of social networks, public forums and similar sites. The step of checking 154 the user's private on-line activities includes the steps of accessing 156 the user's identification data, accessing 158 the electronic network 14, and accessing 170 the user's accounts.

The step of checking 150 the user's 30 on-line activities external to the personal monitoring module, during a public investigation or a private investigation, further includes the steps of comparing 180 the identification data to the monikers found on the electronic network 14, and, determining 182 if the identification data and the monikers found on the electronic network 14 match. If the identification data and the monikers found on the electronic network 14 match, then the personal monitoring module 40 identifies 184 matches as user monikers. The step of checking 150 the user's 30 on-line activities external to the personal monitoring module further includes the step of determining 185 if the user monikers found on the electronic network 14 were used during the investigation period. If the step of determining 185 if the user monikers found on the electronic network 14 were used during the investigation period finds that the user monikers were used during the investigation period, the personal monitoring module 40 makes a positive determination. If a positive determination is made, the step of checking 150 the user's 30 on-line activities external to the personal monitoring module includes the step of restarting 190 the investigation period. If a negative determination is made, the step of checking 150 the user's 30 on-line activities external to the personal monitoring module includes the step of initiating 192 the response module 54.

The initial response is a verification that the user 30 is not participating in on-time activities. That is, the step of performing 104, on a computer, a responsive action includes the steps of alerting 200 the user 30 of the lack of on-line activities, requesting 202 a response from the user 30, and either, identifying 204 a response as an on-line activity, or, performing 206 a number of scripted actions, or performing 207 a number of primary scripted actions, as described below. The step of requesting 202 a response from the user 30 includes, in an exemplary embodiment, the steps of requesting 201 a response from the user within the user response time and determining 203 if the user response has been provided within the user response time.

The verification may also incorporate a response from a proxy 34. That is, the step of performing 104, on a computer, a responsive action further includes the steps of alerting 210 the proxy 34 of the lack of on-line activities by the user 30, requesting 212 a response from the proxy 34 and either, identifying 214 a response as an on-line activity by the user 30, or, performing 216 a number of secondary scripted actions. The step of requesting 212 a response from the proxy 34 includes, in an exemplary embodiment, the step of requesting 211 a response from the user within the proxy response time and determining 213 if the user response has been provided within the user response time. In another embodiment, the step of performing 104, on a computer, a number of responsive actions includes only the steps related to the proxy 34. Further, if there is more than one proxy 34, the steps above are applicable to each proxy 34. That is, the step of performing 206 a number of scripted actions includes a number of sets of scripted actions, for example a number of primary scripted actions and a number of secondary scripted actions. In an embodiment wherein a proxy 34 is used, the primary set of scripted actions are performed 207 upon a tack of response from the user 30 and the secondary set of scripted actions are performed 216 upon a lack of response by the proxy 34. It is further understood that the primary set of scripted actions may be a null set, i.e. no actions are performed until the proxy 34 fails to respond. That is, as used herein with respect to the step of or performing 207 a number of primary scripted actions, the primary "set" of scripted actions can include no actions or a number of actions.

The step of requesting 202 a response from the user is selected from the group consisting of an active verification response or a passive verification response. In an exemplary embodiment wherein the response is an active verification response, the steps of alerting 200 the user 30 of the lack of on-line activities and requesting 202 a response from the user further include the steps of sending 220 the user a verification message, as discussed above, and requesting 222 a response from the user to the verification message. As with the step of requesting 202 a response from the user 30, the step of and requesting 222 a response from the user 30 to the verification message includes the steps of requesting 224 a response from the user to the verification message within the user response time and determining 226 if the user response has been provided within the user response time.

In an exemplary embodiment wherein the user 30 response is a passive verification response from the user 30, the step of requesting 202 a response from the user 30 includes the step of establishing 228 a verification investigation period and the step of checking 150' the user's 30 on-line activities external to the personal monitoring module. The step of checking 150' the user's 30 on-line activities is substantially similar to step 150 described above and includes the sub steps discussed therein, i.e. sub steps 152, 154, 158, 160, 170, 180-186; those sub steps will not be restated herein but may be subsequently identified as being part of the passive verification response, as opposed to the original step of checking 150, by the indication of a "prime" after the reference number. The step of checking 150' the user's 30 on-line activities is repeated for each verification investigation period and continues until there is a step of making a positive determination 186', or, the user response time expires.

If the user 30 responds to the verification message, either passively or actively, the response is identified 204 as an on-line activity. Further, the step of identifying 204 a response as an on-line activity includes the step of restarting 190 the investigation period. If the user 30 does not respond to the verification message within the user response time, the personal monitoring module 40 initiates a further response from the response module 54. In an exemplary embodiment, the further response includes the personal monitoring module 40 performing 206 a number of scripted actions, or, performing 207 a number of primary scripted actions, as described above. The scripted actions include, but are not limited to, the scripted actions described above.

In an embodiment wherein a proxy 34 has been identified, the steps of alerting 210 the proxy 34 of the lack of on-line activities by the user 30 and requesting 212 a response from the proxy include the steps of sending 230 the proxy a verification message, as discussed above, and requesting 232 a response from the proxy to the verification message. As with the step of requesting 212 a response from the proxy 34, the step of and requesting 232 a response from the proxy to the verification message includes the steps of requesting 234 a response from the proxy 34 to the verification message within the proxy response time and determining 236 if the proxy response has been provided within the proxy response time.

If there is more than one proxy 34, the proxy response time for each proxy 34 may occur simultaneously, or, in sequence, the proxy response times run simultaneously, both proxies are alerted and any proxy 34 may respond within the their proxy response time. Alternatively, the user 30 may select for the proxy response times to occur in sequence. In this situation, the steps of alerting 210 the proxy 34 of the tack of on-line activities by the user 30 and requesting 212 a response from the proxy occur with respect to one proxy and, when the proxy response time ends, the steps occur with respect to another proxy. If no proxy 34 responds, the personal monitoring module 40 initiates a further response from the response module 54 as described below, If the proxy 34 responds to the verification message, the response is identified 238 as an on-line activity by the user 30. That is, the personal monitoring module 40 performs the step of identifying 238 the proxy's response as an on-line activity by the user 30. Further, the step of identifying 204 a response as an on-line activity by the user 30 includes the step of restarting 190 the investigation period. If the proxy 34 does not respond to the verification message within the proxy response time, the personal monitoring module 40 initiates a further response from the response module 54. In an exemplary embodiment, the further response includes the personal monitoring module 40 performing 216 a number of secondary scripted actions. The scripted actions include, but are not limited to, the scripted actions described above.

Alternatively, the user 30, or the proxy 34, can actively initiate the scripted actions. That is, the step of determining 100 if a user is responsive includes the step of receiving 106 an instruction indicating the user is nonresponsive. As used herein, "an instruction indicating the user is nonresponsive," means an instruction from the user 30, or the proxy 34 specifically identifying that the user 30 is non-responsive. This may be accomplished, for example, by the user 30, or the proxy 34, accessing the personal monitoring module 40 and clicking on an input option indicating that the user 30 is non-responsive. That is, as the step of performing 206 a number of scripted actions is, in the embodiment above, started after a determination that the user 30 is nonresponsive which in turn initiates the step of performing 206 a number of scripted actions. It is understood that an instruction from the user 30 may be considered a "response," but for consistency in terminology, the meaning of the term "an instruction indicating the user is nonresponsive" redefines a response from the user 30 that initiates the step of performing 206 a number of scripted actions as the user 30 being "nonresponsive," Moreover, it is believed that the step of receiving 106 an instruction indicating the user is nonresponsive is more likely to be sent by a proxy 34 when the user 30 is incapacitated or otherwise nonresponsive.

In view of the prediction that the step of receiving 106 an instruction indicating the user is nonresponsive will more likely be initiated by the proxy 34, the following description shall use the proxy 34 as the active participant. It is understood, however, that any step used in relation to the step of receiving 106 an instruction indicating the user is nonresponsive can be performed by the user 30. The step of receiving 106 an instruction indicating the user is nonresponsive includes the steps of, allowing 250 the proxy to log-in and verify 252 the proxy's identity (e.g. by requesting the proxy 34 enter the proxy password), and determining 254 that a request to initiate a responsive action has been made. The step of receiving 106 an instruction indicating the user is nonresponsive further includes the steps performing 206 a number of scripted actions, or performing 207 a number of primary scripted actions and performing 216 a number of secondary scripted actions, as described above.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A computer implemented method of personal monitoring comprising the steps of:
   determining if a user is responsive;
   if the determination is negative, performing, on a computer, a number of responsive actions;
   wherein said step of determining if a user is responsive includes the steps of:
      allowing said user to engage in a number of on-line activities;
      determining, on a computer, if said user engaged in on-line activities;
      if said determination that said user engaged in on-line activities is negative, then performing, on a computer, a number of responsive actions;
   wherein said step of allowing a user to engage in a number of on-line activities includes:
      initializing a personal monitoring module, said monitoring module structured to monitor external on-line activity; and
      allowing said user to engage in a number of on-line activities external to said personal monitoring module;
   wherein said step of determining, on a computer, if said user engaged in on-line activities includes the step of checking said user's on-line activities external to said personal monitoring module;
   allowing said user to identify a proxy;
   alerting said proxy of the lack of on-line activities by the user;
   requesting a response from a proxy;
   if said proxy responds, then identifying said response as an on-line activity;

allowing said user to identify a number of scripted actions, including a number of primary actions and a number of secondary actions;
allowing said user to establish a proxy response time;
requesting a proxy response within said proxy response time;
determining if a proxy response has been provided within said proxy response time; and
if no proxy response has been provided within said user response time, then performing, on a computer, the secondary actions identified by the user.

* * * * *